United States Patent
Kohn et al.

(10) Patent No.: US 10,318,306 B1
(45) Date of Patent: Jun. 11, 2019

(54) MULTIDIMENSIONAL VECTORS IN A COPROCESSOR

(71) Applicant: Ambarella, Inc., Santa Clara, CA (US)

(72) Inventors: Leslie D. Kohn, Saratoga, CA (US); Robert C. Kunz, Sunnyvale, CA (US)

(73) Assignee: Ambarella, Inc., Santa Clara, CA (US)

( * ) Notice: Subject to any disclaimer, the term of this patent is extended or adjusted under 35 U.S.C. 154(b) by 61 days.

(21) Appl. No.: 15/598,637

(22) Filed: May 18, 2017

Related U.S. Application Data

(60) Provisional application No. 62/500,728, filed on May 3, 2017.

(51) Int. Cl.
*G06F 9/38* (2018.01)
*G06F 17/16* (2006.01)

(52) U.S. Cl.
CPC .......... *G06F 9/3877* (2013.01); *G06F 9/3851* (2013.01); *G06F 17/16* (2013.01)

(58) Field of Classification Search
None
See application file for complete search history.

(56) References Cited

U.S. PATENT DOCUMENTS

| | | | | |
|---|---|---|---|---|
| 5,873,081 A * | 2/1999 | Harel | ................ | G06F 17/30699 |
| 6,041,405 A * | 3/2000 | Green | ................ | G06F 9/30152 712/210 |
| 6,056,690 A * | 5/2000 | Roberts | ................ | G06K 9/6293 600/300 |
| 8,281,297 B2 * | 10/2012 | Dasu | ................ | G06F 8/433 717/161 |
| 8,464,271 B2 * | 6/2013 | Eichenberger | ................ | G06F 8/445 711/168 |
| 8,706,601 B1 * | 4/2014 | Payne | ................ | G06Q 40/06 705/35 |
| 9,684,944 B2 * | 6/2017 | Taylor | ................ | G06T 1/20 |
| 9,720,851 B2 * | 8/2017 | Debenedictis | ................ | G06F 12/1458 |
| 2002/0056078 A1 * | 5/2002 | Inagaki | ................ | G06F 8/445 717/155 |
| 2003/0055614 A1 * | 3/2003 | Pelikan | ................ | G06N 3/126 703/2 |
| 2006/0036413 A1 * | 2/2006 | Campbell | ................ | G06F 9/38 703/2 |
| 2007/0294682 A1 * | 12/2007 | Demetriou | ................ | G06F 8/45 717/153 |
| 2015/0199214 A1 * | 7/2015 | Lee | ................ | G06F 9/505 718/102 |
| 2016/0117189 A1 * | 4/2016 | Osborne | ................ | G06F 9/4881 718/102 |

* cited by examiner

*Primary Examiner* — Eric Coleman
(74) *Attorney, Agent, or Firm* — Christopher P. Maiorana, PC

(57) ABSTRACT

An apparatus includes a scheduler circuit and a plurality of hardware engines. The scheduler circuit may be configured to (i) store a directed acyclic graph, (ii) parse the directed acyclic graph into one or more operators and (iii) schedule the one or more operators in one or more data paths. The hardware engines may be (i) configured as a plurality of the data paths and (ii) configured to generate one or more output vectors by processing zero or more input vectors using the operators. One or more of the hardware engines supports a range of multiple dimensions of the input vectors from zero dimensions to at least four dimensions.

20 Claims, 9 Drawing Sheets

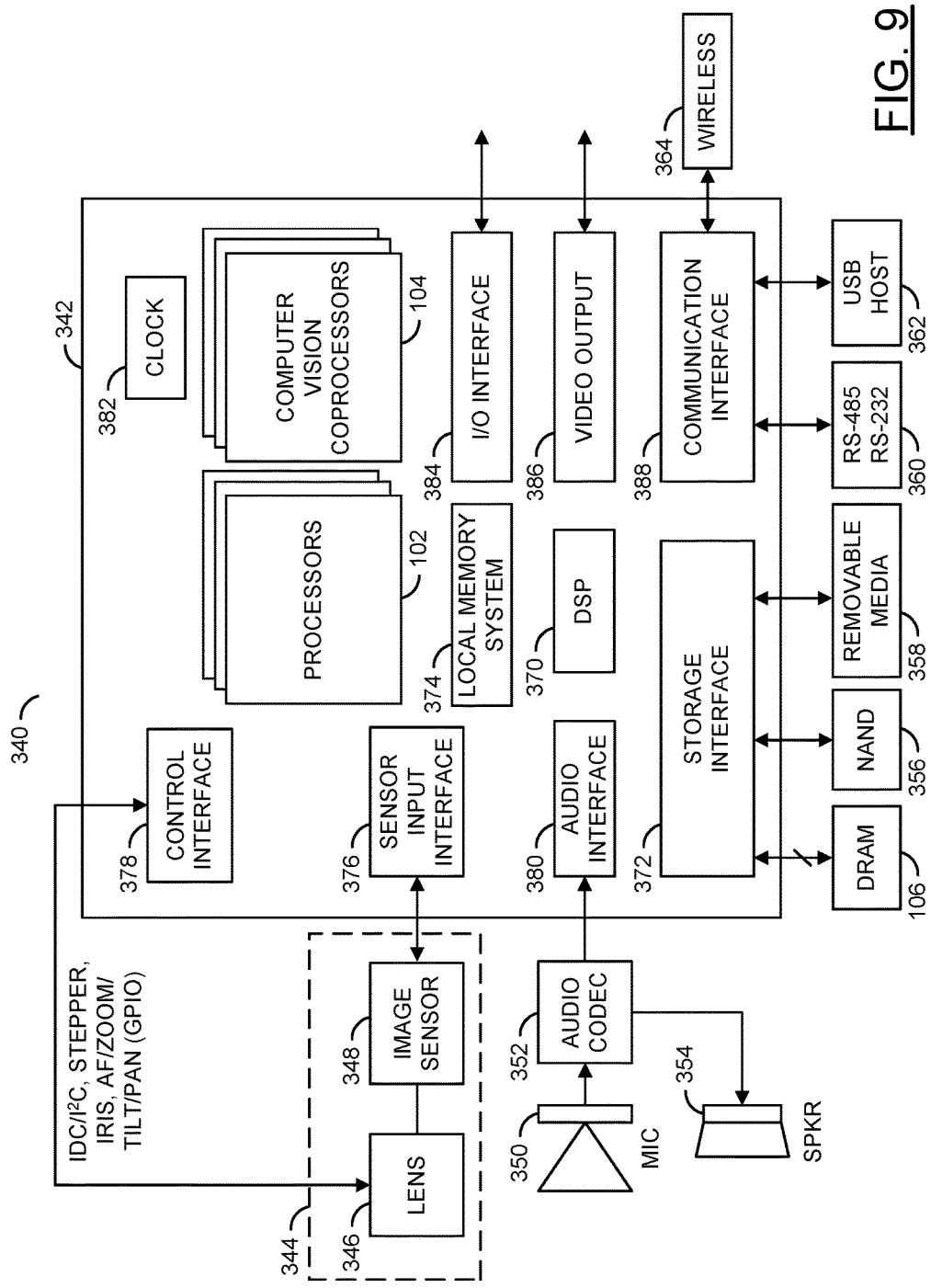

MULTIDIMENSIONAL VECTORS IN A COPROCESSOR

This application relates to U.S. Provisional Application No. 62/500,728, filed May 3, 2017, which is hereby incorporated by reference in its entirety.

FIELD OF THE INVENTION

The invention relates to vector processing generally and, more particularly, to a method and/or apparatus for implementing multidimensional vectors in a coprocessor.

BACKGROUND

Conventional general purpose programmable processors executing sequential streams of instructions address different criteria across diverse problem domains. Aggressive pipelining and out-of-order execution have been applied to extract parallelism from the instruction streams, but the gains are limited by inherent data and control dependencies. To further improve performance, single instruction, multiple data (SIMD) instructions and multiple cores executing parallel instruction streams have been used. However, the resulting implementations tend to be inefficient and do not exploit detailed understandings of the problem domain to optimize data paths and dynamic random access memory bandwidth. Furthermore, the implementations are difficult for compilers to extract the inherent parallelism of processes expressed in conventional programming languages. The demanding specifications of real time computer vision processing drives toward a more power and cost efficient implementation using specialized engines for computer vision tasks. However, computer vision tasks are rapidly evolving and the specialized engines are not commonly flexible to support new or enhanced tasks.

It would be desirable to implement multidimensional vectors in a coprocessor.

SUMMARY

The invention concerns an apparatus including a scheduler circuit and a plurality of hardware engines. The scheduler circuit may be configured to (i) store a directed acyclic graph, (ii) parse the directed acyclic graph into one or more operators and (iii) schedule the one or more operators in one or more data paths. The hardware engines may be (i) configured as a plurality of the data paths and (ii) configured to generate one or more output vectors by processing zero or more input vectors using the operators. One or more of the hardware engines supports a range of multiple dimensions of the input vectors from zero dimensions to at least four dimensions.

BRIEF DESCRIPTION OF THE FIGURES

Embodiments of the invention will be apparent from the following detailed description and the appended claims and drawings in which:

FIG. 9 is a diagram of a camera system.

DETAILED DESCRIPTION OF THE EMBODIMENTS

Figure 1:
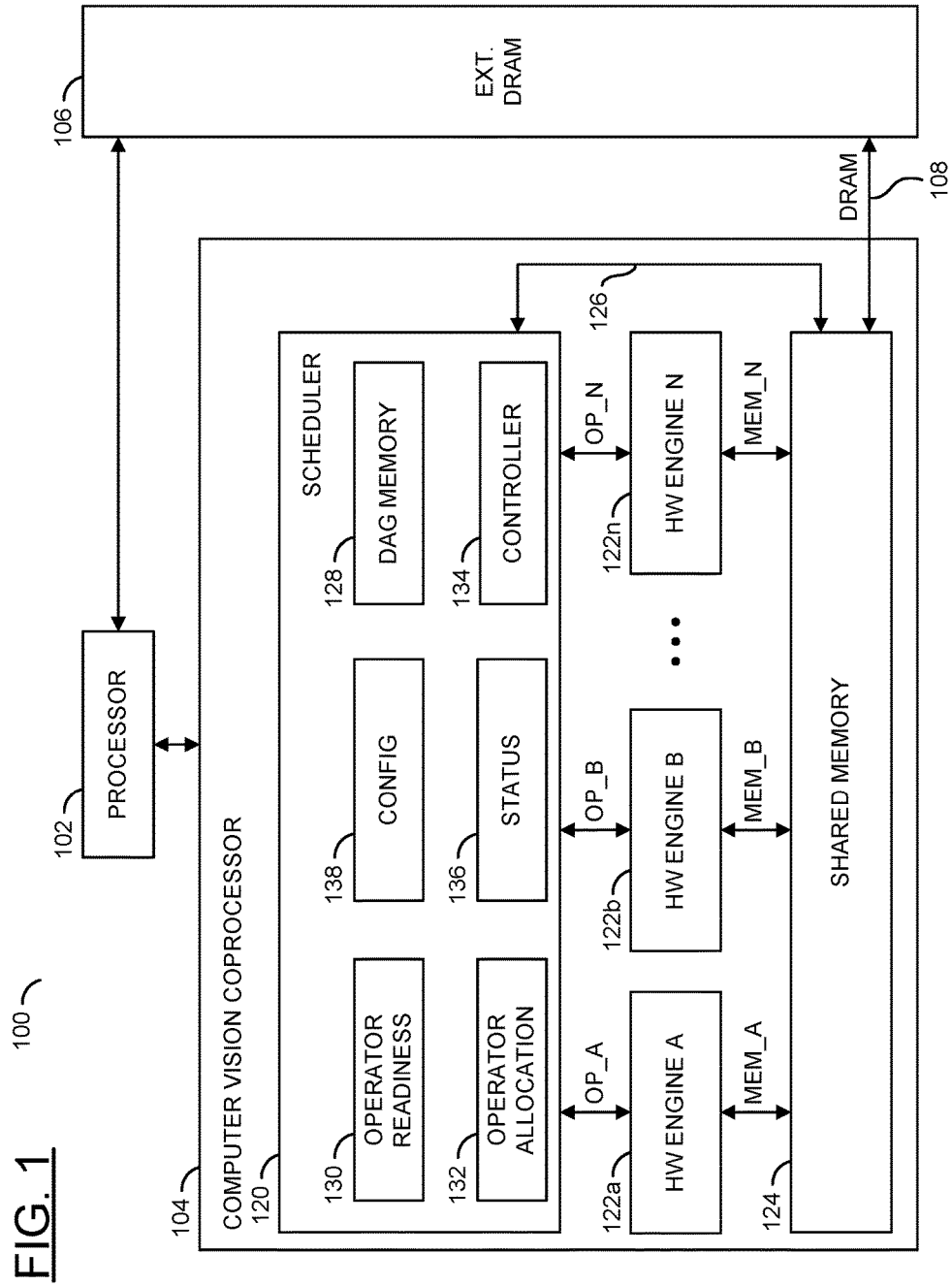
FIG. 1 is a diagram of a system.

Embodiments of the present invention include providing multidimensional vectors in a coprocessor that may (i) provide a flexible hardware coprocessor engine, (ii) execute data flow graphs for computer vision tasks, (iii) operate on variable size vectors, (iv) operate on multidimensional vectors, (v) implement high level operations solely in hardware, (vi) optimize internal memory bandwidth, (vii) optimize external memory bandwidth and/or (viii) be implemented as one or more integrated circuits.

Embodiments of the architecture generally implement a flexible hardware coprocessor engine for directly executing data flow graphs for computer vision tasks. Each data flow graph may be specified as a set of operators connected through a directed acyclic graph (DAG) structure that specifies explicit dependencies. The operators may operate on variable-size multidimensional vectors. In addition to simple operators like add and multiply, higher level operations such as convolution and matrix multiply may be provided in the coprocessor. The architecture generally allows computer vision tasks to more efficiently use available hardware units, and to optimize an external memory bandwidth and an internal memory bandwidth.

The computer vision tasks may contain extensive data parallelism in the form of vector operations on images and/or multidimensional vectors. Each directed acyclic graph may specify primary inputs (loaded from memory), primary outputs (stored to memory) and a set of operations. The operations may be related to each other (e.g., by links) with some operations running in parallel. Each input of an operation, if any, may be connected to a primary input or an output of an upstream operation. Each output of each operation may be connected to a primary output and/or downstream operation inputs. The directed acyclic graphs generally allow full parallelism of the tasks to be expressed by eliminating control flow dependencies and making all data dependencies explicit.

Processing a directed acyclic graph in a direct manner generally involves loading all input vectors from and storing all output vectors of each operator to an external memory circuit. The external memory circuit and a memory bus alone may bottleneck an effective rate of computation and available parallelism even with a general-purpose caching hierarchy. Alternatively, the full input vectors and the output vectors may be stored in on-chip memory, but the amount of on-chip memory may be large.

In various embodiments, the coprocessor may execute multiple operators in parallel while only buffering a minimal amount of vector data in the on-chip memory suitable for scheduled operators to make progress. The coprocessor generally includes dedicated on-chip resources (e.g., data paths) for processing the operators. Different types of data paths may be optimized for specific operators or groups of operators with similar control structures and memory access patterns. While a single instance of a data path may run only a single operator at once in some instances, generally a one-to-one correspondence generally does not exist between an operator and a data path. Various embodiments of the coprocessor may include many data paths that may run the same operator type, and/or a single data path that may run many types of operators. Separate implementations of the coprocessor may contain different operators and types of supported data paths.

A small (or minimal) amount of data may be buffered on-chip by the coprocessor for operators to continue making progress. The minimum amount of data may be large depending on the type of operation. For example, a windowed operation typically buffers up to several rows before process a moving window over available input to generate the output data. In some cases, the minimum amount of data may be the entire vector (called a full-vector buffer). The vectors in such cases are generally constrained to a size that fits the on-chip memory.

The coprocessor generally includes a scheduling mechanism to allow the hardware to automatically process operators that are ready to run using the on-chip resources that may be available. The scheduling may minimize the amount of buffering performed by allowing an operator to partially execute on a data path. If enough input data is available for the operator to progress, the scheduling mechanism may place the operator on a data path. The scheduling mechanism may enable out-of-order execution of operators and may virtualize a relationship between the operator and the data paths.

Referring to FIG. 1, a diagram of a system 100 is shown illustrating a context in which one or more vector processing operations may be implemented in accordance with an example embodiment of the invention. The system (or apparatus) 100 may be implemented as part of a computer vision system. In various embodiments, the system 100 may be implemented as part of a camera, a computer, a server (e.g., a cloud server), a smart phone (e.g., a cellular telephone), a personal digital assistant, or the like.

In an example embodiment, the system 100 generally comprises a block (or circuit) 102, a block (or circuit) 104, a block (or circuit) 106 and a memory bus 108. The circuit 104 generally comprises a block (or circuit) 120, one or more blocks (or circuits) 122a-122n, a block (or circuit) 124 and a path 126. The circuit 120 may include a block (or circuit) 128, a block (or circuit) 130, a block (or circuit) 132, a block (or circuit) 134, a block (or circuit) 136 and a block (or circuit) 138.

Multiple signals (e.g., OP_A to OP_N) may be exchanged between the circuit 120 and the respective circuits 122a-122n. Each signal OP_A to OP_N may convey processing operation information and/or yield operation information. Multiple signals (e.g., MEM_A to MEM_N) may be exchanged between the respective circuits 122a-122n and the circuit 124. The signals MEM_A to MEM_N may carry data. A signal (e.g., DRAM) may be exchanged between the circuit 106 and the circuit 124. The signal DRAM may transfer data between the circuits 106 and 124.

The circuit 102 may implement a processor circuit. In some embodiments, the processor circuit 102 may be a general purpose processor circuit. The processor circuit 102 may be operational to interact with the circuit 104 and the circuit 106 to perform various vector processing tasks.

The circuit 104 may implement a coprocessor circuit. The coprocessor circuit 104 is generally operational to perform specific vector processing tasks as arranged by the processor circuit 102. The coprocessor circuit 104 may be separate from the processor circuit 102 and generally helps the primary processor circuit 102 to accomplish the vector processing tasks. In various embodiments, the coprocessor circuit 104 may operate as a directed acyclic graph vector processor implemented solely in hardware. The coprocessor circuit 104 may directly perform a data flow directed acyclic graph generated by software that specifies vector processing (e.g., computer vision processing) tasks. The directed acyclic graph generally contains descriptors that specify input/output buffers in the circuit 106 and/or the circuit 124, computation nodes that perform vector processing computations, called operators (or tasks), and the dependencies between data buffers and the operators (e.g., links in the graphs).

The circuit 106 may implement a dynamic random access memory (DRAM) circuit. The DRAM circuit 106 is generally operational to store multidimensional arrays of input data elements and various forms of output data elements. The DRAM circuit 106 may exchange the input data elements and the output data elements with the processor circuit 102 and the coprocessor circuit 104.

The circuit 120 may implement a scheduler circuit. The scheduler circuit 120 is generally operational to schedule tasks among the circuits 122a-122n to perform a variety of computer vision tasks as defined by the processor circuit 102. Individual tasks may be allocated by the scheduler circuit 120 to the circuits 122a-122n. The scheduler circuit 120 may time multiplex the tasks to the circuits 122a-122n based on the availability of the circuits 122a-122n to perform the work. Additional details of the scheduler circuit 120 may be available in co-pending U.S. application Ser. No. 15/581,341, filed Apr. 28, 2017, Ser. No. 15/591,352, filed May 10, 2017, and Ser. No. 15/593,463, filed May 12, 2017, each of which are hereby incorporated by reference in their entirety.

Each circuit 122a-122n may implement a processing resource (or hardware resource or hardware engine). The hardware engines 122a-122n are generally operational to perform specific processing tasks. In some configurations, the hardware engines 122a-122n may operate in parallel and independent of each other. In other configurations, the hardware engines 122a-122n may operate collectively among each other to perform allocated tasks. The hardware engines 122a-122n may be homogenous processing resources (all circuits 122a-122n may have the same capabilities) or heterogeneous processing resources (two or more circuits 122a-122n may have different capabilities). The operators performed by the hardware engines 122a-122n may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum operator, a non-maximum suppression operator, a gather operator, a scatter operator, a statistics operator, a classifier operator, an integral image operator, an upsample operator and a sums of horizontally overlapping sliding windows operator. In various embodiments, the hardware engines 122a-122n may be implemented solely as hardware circuits. Additional details of hardware engine implementations may be found in co-pending U.S. application Ser. No. 15/291,273 filed Oct. 12, 2016, Ser. No. 15/372,995 filed Dec. 8, 2016, Ser. No. 15/403,540 filed Jan. 11, 2017, Ser. No. 15/405,456 filed Jan. 13, 2017, Ser. No. 15/444,641 filed Feb. 18, 2017, and Ser. No. 15/581,220, filed Apr. 28, 2017, 62/492,435, filed May 1, 2017, 62/500,060, filed May 2, 2017, Ser. No. 15/590,251, file May 9, 2017 and Ser. No. 15/591,530, filed May 10, 2017, each of which are hereby incorporated by reference in their entirety.

The circuit 124 may implement a shared memory circuit. The shared memory 124 is generally operational to store all of or portions of the multidimensional arrays (or vectors) of input data elements and output data elements generated by the hardware engines 122a-122n. The input data elements may be received from the DRAM circuit 106 via the memory bus 108. The output data elements may be sent to the DRAM circuit 106 via the memory bus 108.

The path 126 may implement a transfer path internal to the coprocessor circuit 104. The transfer path 126 is generally operational to move data from the scheduler circuit 120 to the shared memory 124. The transfer path 126 may also be operational to move data from the shared memory 124 to the scheduler circuit 120.

The circuit 128 may implement a local directed acyclic graph (DAG) memory. The DAG memory 128 may be operational to store one or more binary representations of one or more directed acyclic graphs used by the scheduler circuit 120. The directed acyclic graph representations may be compiled external to the system 100 and loaded into the DAG memory 128 through the shared memory 124.

The circuit 130 may implement an operator readiness circuit. The operator readiness circuit 130 is generally operational to determine when operators are ready for processing in the hardware engines 122a-122n. An operator is generally ready for processing when all operands (e.g., input vectors) corresponding to that operator are ready.

The circuit 132 may implement an operator allocation circuit. The operator allocation circuit 132 may be operational to allocate the operators and corresponding operands among one or more hardware engines 122a-122n for processing. The allocation may be based on availability of the hardware engines 122a-122n, the readiness of the operators and the operands, and a priority of the operands.

The circuit 134 may implement a controller circuit. The controller circuit 134 may receive a directed acyclic graph either directly from the processor circuit 102, indirectly from the DRAM circuit 106 or from the shared memory 124. The directed acyclic graph may be stored in the DAG memory 128. Upon receipt of a run command from the processor circuit 102, the controller circuit 134 may parse the directed acyclic graph into one or more data flows. Each data flow may include one or more operators. Once the directed acyclic graph is parsed, the controller circuit 134 may allocate the data flows/operators to the hardware engines 122a-122n and send the relevant operator configuration information to start the operators.

The circuit 136 may implement a status circuit (or registers). The status registers 136 is generally operational to store status of the hardware engines 122a-122n, the processing of the operators, and the status of the operands. The status data may be exchanged with the controller circuit 134.

The circuit 138 may implement a configuration circuit (or registers). The configuration registers 138 are generally operational to store configuration data of the hardware engines 122a-122n. The configuration data may be exchanged with the controller circuit 134.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands. In some embodiments, multiple (e.g., two) separate tables may be employed, a table of all operators and another table of all descriptors linked together with explicit registers.

The directed acyclic graph descriptions may be different than traditional processor programs in several fundamental ways. Dependencies between operators may occur locally and are stated explicitly in the directed acyclic graph instead of implied by the sequential ordering of instructions in the program. In conventional instruction streams, instructions share states through global state registers or on-chip memory. While the directed acyclic graph supports conditional execution, the vector processing (e.g., coprocessor 104) may execute natively without benefit of a program counter or control flow present in instruction streams. Looping generally exists as higher dimensions in a vector and without the aid of looping variables. Operator inputs and outputs may be vector operands of up to several (e.g., 4) or more dimensions. The size of each dimension may be variable, rather than a few fixed-size scalar or single instruction, multiple data (SIMD) data types. Complex vector operations generally allow tasks to be efficiently expressed. Furthermore, the directed acyclic graphs may have no concept of a program counter or instruction streams. A master scheduler (e.g., the scheduler circuit 120) may time-multiplex operators on available hardware resources (e.g., the hardware engines 122a-122n) based on data dependencies expressed in the graph. In traditional processors, instructions execute atomically. In the vector processor, complex operators with some input data available, may partially execute based on available hardware resources. Partial execution generally allows the hardware resources to be scheduled more efficiently and allows on-chip memory (e.g., the shared memory 124) to be used to pass results between operators instead of storing and loading from an external memory (e.g., the DRAM circuit 106).

Operators may use optimized data paths to directly perform complex vector operations efficiently and with lower memory bandwidth. The data paths may replace nested for-loops that repeat a code sequence on a conventional processor, and associated overhead like loop unrolling, software pipelining, branch prediction and superscalar execution. The operators may match common looping structures present in computer vision tasks and image processing tasks. The directed acyclic graphs may connect the complex operators into computational pipelines, with conditional execution, finite iteration, and direct memory access (DMA) transfers that execute in parallel as resources are available without intervention by software. The directed acyclic graphs generally provide a flexible way to specify new tasks (or processes), while still providing better efficiency than conventional processors. Additional details for the architecture of the system 100 may be found in co-pending U.S. application Ser. No. 15/459,284, filed Mar. 15, 2017, which is hereby incorporated by reference in its entirety.

Figure 2:
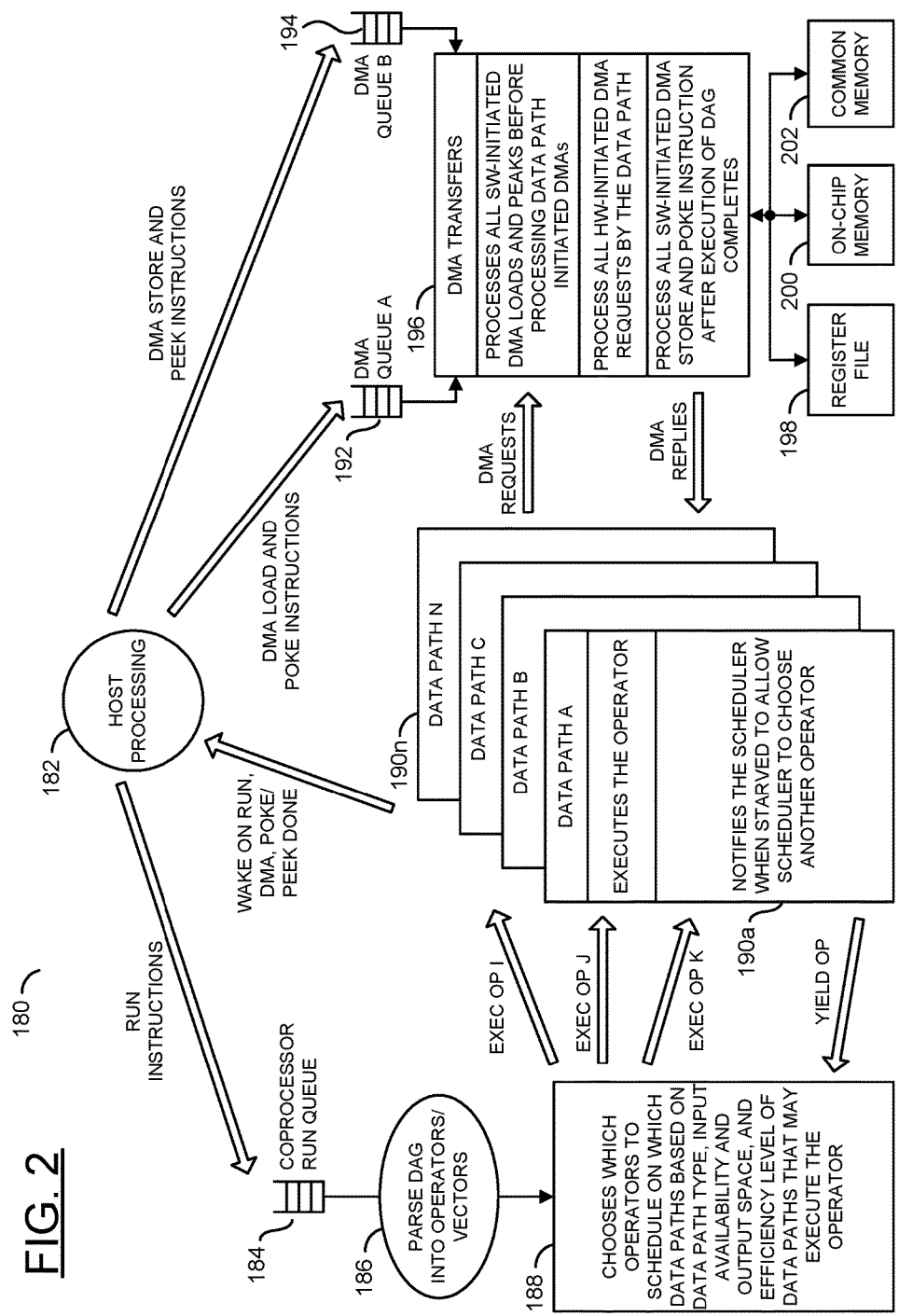
FIG. 2 is a flow diagram of vector processing.

Referring to FIG. 2, a flow diagram of example vector processing 180 is shown. The vector processing 180 generally comprises a step (or state) 182, a step (or state) 184, a step (or state) 186, a step (or state) 188, one or more steps (or states) 190a-190n, a step (or state) 192, a step (or state) 194, a step (or state) 196, a step (or state) 198, a step (or state) 200 and a step (or state) 202. The vector processing 180 may be implemented by the system 100.

The directed acyclic graph vector processing performed by the coprocessor 104 generally supports the general-purpose host processing in the processor 102 where the processor 102 may execute traditional reduced instruction set computing (RISC)-based instructions. Software running on the processor 102 may be the controlling task. Prior to run time, a directed acyclic graph compiler may prepare one or more binary representations of one or more directed acyclic graphs composed of the operators, the location of primary input/output data structures in DRAM circuit 106, and the links between operators through the shared memory 124. The directed acyclic graph binary representations may be loaded into the DAG memory 128.

As the processor 102 executes a coprocessor instruction, the instruction may be placed into a queue of the coprocessor 104. The coprocessor 104 processes the coprocessor instruction from each queue, one at a time. Fetching of input vectors from the DRAM circuit 106 may be specified by separate direct memory access instructions that are not part of the current directed acyclic graph, or may be initiated by the directed acyclic graph. In the latter case, whole input vectors and/or only part of the input vectors may be loaded at any one time. Similarly, stores may be either separate direct memory access instructions or initiated by the directed acyclic graph, in which case whole vectors and/or only part of the vectors may be stored at any one time.

Software running on the processor 102 may command processing of the directed acyclic graph in the coprocessor 104 by executing a "run" coprocessor instruction in the step 182. The "run" coprocessor instruction may be buffered in a coprocessor run queue in the step 184. The "run" instruction generally specifies the address of the directed acyclic graph representation in the DAG memory 128 as an input argument. In some situations, the graphs may be triggered by other means, such as a store to a particular address.

The scheduler circuit 120 may parse the directed acyclic graph into one or more operators and one or more input vectors in the step 186. The scheduler circuit 120 may schedule processing of the operators in the directed acyclic graph in the step 188, and subsequently notify the processor 102 when the directed acyclic graph completes the processing. The scheduler circuit 120 may choose which operators to schedule on which data paths 190*a*-190*n* based on the data path types, input availability, output space, and/or efficiency levels of the data paths that may execute the operators. Each data path 190*a*-190*n* generally corresponds to a respective hardware engine 122*a*-122*n*. Each data path 190*a*-190*n* may deal with a single operation at a time. The scheduling may result in execution operations (e.g. EXEC OP I to EXEC OP K) being issued to the data paths 190*a*-190*n*. In various situations, multiple operators may be executed in parallel.

In some situations, feedback paths may be appropriate to perform the vector processing tasks. However, directed acyclic graphs generally do not contain any directed cycles and lack any looping control structure. The lack of looping control generally simplifies scheduling, limits internal buffering, and avoids deadlock conditions. Looping control may be performed by the scheduling task 188 that may run a directed acyclic graph multiple times.

In addition to the "run" command, the processor 102 generally supplies other support instructions to allow software executing in the processor 102 some control over the hardware processing. Poke Instructions: The software may make some adjustments to the compiled directed acyclic graph by supplying parameters to guide execution and/or fill in fields that are unknown at directed acyclic graph compilation time. The poke instructions may be buffered in a DMA queue A in the step 192. By way of example, the poke instructions may include the locations of input/output vectors in the DRAM circuit 106 that are unknown during directed acyclic graph compilation.

Peek instructions: The software may specify return values from the directed acyclic graphs after execution completed.

The peek instructions may be buffered in a DMA queue B in the step 194. In peek instruction cases, the software may request a transfer in the step 198 from the coprocessor 104 into a general purpose register file in the processor 102. The transfer generally occurs when the coprocessor 104 notifies the controlling task that the directed acyclic graph has completed. The number of registers on the processor 102 may be limited, so only a few results may be returned with each peek instruction. Larger results are generally stored to the DRAM circuit 106.

Wait: A wait instruction may stall the controlling task until all of the instructions for the current directed acyclic graph have completed (including peek instructions and poke instructions). The hardware in the coprocessor 104 generally controls the timing of run, poke/peek, or other vector processor instructions. When the controlling task executes vector processor instructions, the processor 102 may notify the coprocessor 104 that software requests the operations to happen in an ordered way relative to the run instruction (typically pokes before the run command, and peeks afterwards). However, the timing of when the instructions actually execute may be controlled completely by the scheduler circuit 120. Other types of instructions may be implemented to meet the design criteria of a particular application.

The direct memory access transfers may be performed in the step 196 by a direct memory access engine. A highest priority of the direct memory access transfers may be to process all software-initiated direct memory access load instructions and peek instructions before processing direct memory access transfers initiated by the data paths 190*a*-190*n*. Next, the direct memory access transfers may process all hardware-initiated request made by the data paths 190*a*-190*n*. Finally, the software-initiated direct memory access transfers for store instructions and poke instructions may be executed after the directed acyclic graph tasks are complete. The direct memory access transfers may take place between the host processing (e.g., the processor 102) in the step 182, the register files in the step 198, an on-chip memory (e.g., the shard memory 124) in the step 200 and/or the common memory (e.g., the DRAM circuit 106) in the step 202.

Vectors may be viewed as collections of data elements that share a same arithmetic type. The types may include, but are not limited to, integer, fixed point, floating point, or more general element types (e.g. complex number). General C-structures do not map directly into a vector because each data element shares the same type. The vectors may have a range of dimensions from zero dimensions (e.g., scalar vectors) to N-dimensional (e.g., four dimensions or higher dimensions). A value of N may be determined by the specific implementation of the system 100. In various embodiments, the systems 100 may support vectors of all dimensions between zero and N. In some embodiments, the value of N may be at least four.

Some vector dimensions may have a fixed length. Other vector dimensions may have a variable length. The vectors may be used for every connection in the directed acyclic graph vector processing, including primary inputs/output and inter-operator links. Each operator may consumer zero or more input vectors to produce at least one output vector. In some situations, an operator (e.g., a random number generator) may not receive any input operands.

Each vector generally has a dimensionality from a zero dimension (e.g., a scalar vector) to N-dimensions. A value of N may be determined by the specific implementation of the system 100. In various embodiments, the systems 100 may support vectors of all dimensions between zero and N. In some embodiments, the value of N may be at least four.

Each dimension of a vector may have a magnitude, either a unary (1) magnitude or a significant (>1) magnitude. The unary-magnitude dimensions generally reduce an effective dimensionality of the vector. For example, a two-dimensional vector may be represented by as N-dimensional vector having two significant dimensions and N−2 unary dimensions.

Data structures within an inner loop of C code generally have different dimensionalities. For example, the same scalar value may be added to each element in a multidimensional structure. While the dimensionalities of input operands in a for-loop structure differ, the iterations through the for-loop may be the same. Elements in a data structure are reused if a looping index variable is not used during indexing of the data structure. A similar case in the vector processing generally occurs when an input operand has a unary size along a particular dimension and another input operand has a different magnitude along the particular dimension.

Consider the following two-dimensional example. Let X be a two-dimensional vector of H×W (rows x columns), Y is a one-dimensional vector of H×1, Z is a one-dimensional vector of 1×W, and K is a scalar vector of 1×1. For each row from zero to H, and for each column (col) from zero to W, a two-dimensional vector W may be defined by formula 1 as follows:

$$W[row][col]=X[row][col]+Y[row]+Z[col]+K \qquad (1)$$

The scalar vector K may not be indexed by row or column and thus repeated for every element in the two-dimensional vector W. Each entry in the vector Y may be constant for every column in a row. The entire vector Z may be reused for every row in the image.

The coprocessor 104 generally implements such reuse through dimensional upconversion by converting any unary dimension of an input vector to a significant dimension of another input vector to the operator. The operator may apply the dimension upconversion automatically based on the dimensionality of the input operands. An example upconversion involving two vectors (e.g., V0 and V1) is shown in Table I as follows:

TABLE I

| V0 Dimension | V1 Dimension | Upconverted Dimension | Comment |
|---|---|---|---|
| 1 | 1 | 1 | Unary dimension |
| 1 | N | N | Dimension Upconversion of V0 to V1 |
| N | 1 | N | Dimension Upconversion of V1 to V0 |
| N | M | Not Applicable | No Dimensional Upconversion. Only legal if N == M |

Dimensional upconversion generally applies along all dimensions of the vector. For example, the vector X may have dimensions P×1×H×1 and the vector Y may have dimensions 1×D×1×W before the upconversions. For a common dimension size of N=4, both vectors X and Y may have dimensions P×D×H×W after applying the dimensional upconversion rules. The coprocessor 104 generally optimizes the upconversions by avoiding unnecessary copying of upconverted data by using index addressing into the vectors.

Figure 3:
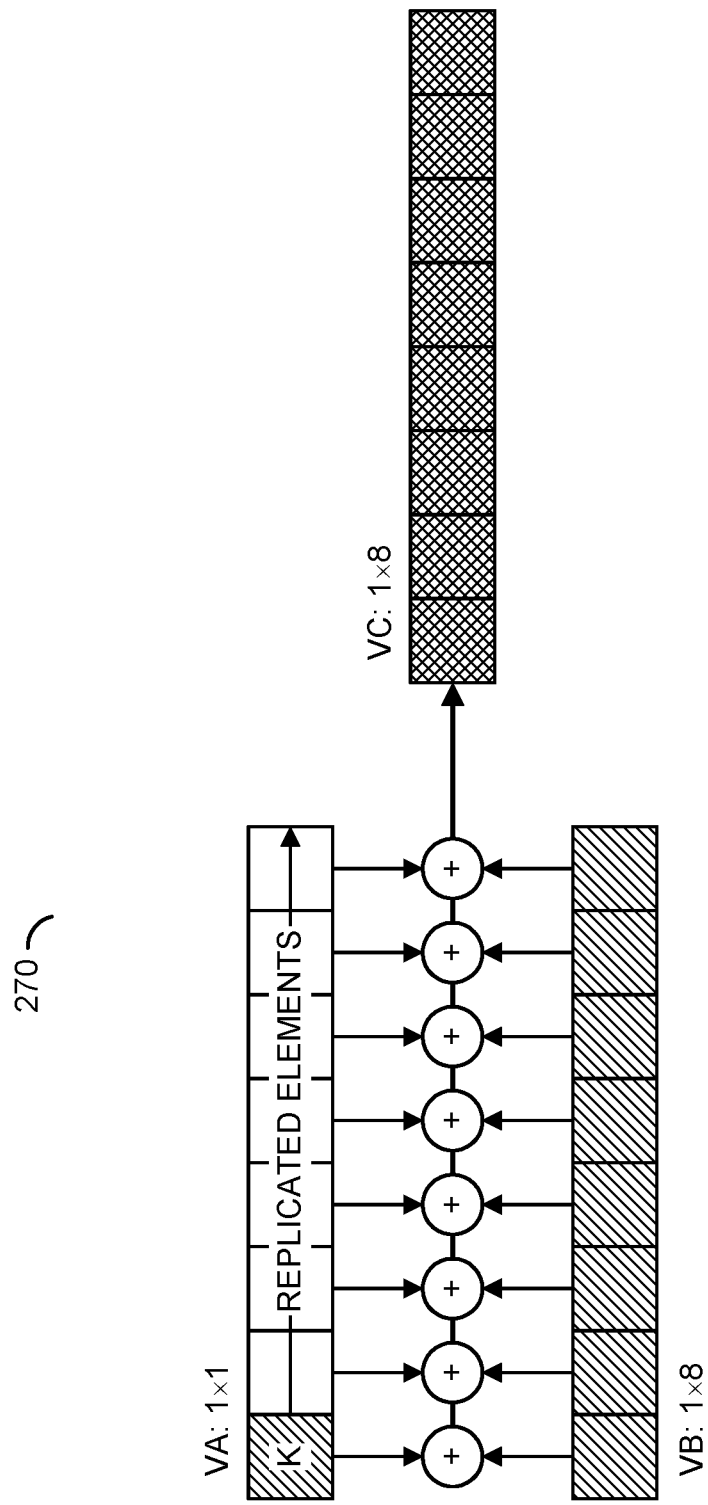
FIG. 3 is a diagram of a vector upconversion.

Referring to FIG. 3, a diagram of an example vector upconversion 270 is shown. A scalar vector (e.g., VA) may have a value (e.g., K). A one-dimensional vector (e.g., VB) may have multiple (e.g., 8) values. A sum vector (e.g., VC) may be a sum of the vectors VA and VB per formula 2 as follows:

$$VC=VA+VB \qquad (2)$$

Per Table I, the vector VA may be upconverted to the dimensions of the vector VB (e.g., 1×8). During the upconversion, the value K may be replicated into the other elements of the vector VA. The summation may subsequently take place on an element-by-element basis between the vector VA and VB.

Figure 4:
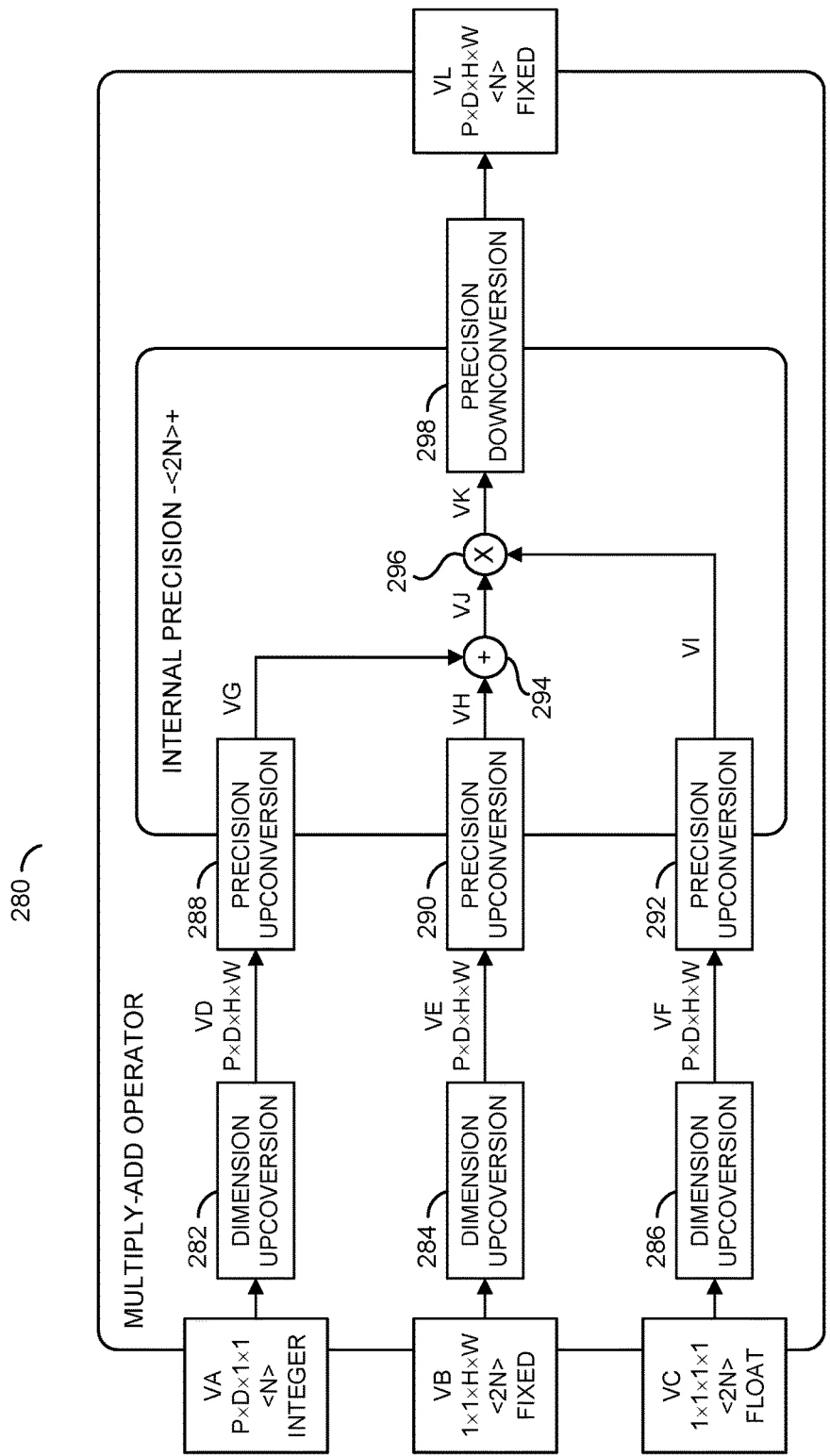
FIG. 4 is a diagram of a multiply-add operator circuit using vector conversions.

Referring to FIG. 4, a diagram of an example implementation of a multiply-add operator circuit 280 using vector conversions is shown. The operator circuit (or block) 280 may be implemented in one or more of the hardware engines 122a-122n. The operator circuit 280 generally comprises a block (or circuit) 282, a block (or circuit) 284, a block (or circuit) 286, a block (or circuit) 288, a block (or circuit) 290, a block (or circuit) 292, a block (or circuit) 294, a block (or circuit) 296 and a block (or circuit) 298.

The operator circuit 280 may receive multiple input vectors having different dimensions. In the example illustrated, the circuit 282 may receive a vector (e.g., VA). The vector VA may be a two-dimensional vector (e.g., P×D×1×1), have a precision (e.g., N) and may be in an integer format. A vector (e.g., VB) may be received by the circuit 284. The vector VB may be a two-dimensional vector (e.g., 1×1×H×W), have a double precision (e.g., 2N) and be in a fixed decimal format. The circuit 286 may receive a vector (e.g., VC). The vector VC may be a scalar vector (e.g., 1×1×1×1), have the double precision (e.g., 2N) and be in a floating point format.

Each circuit 282, 284 and 286 may implement a dimensional upconversion circuit. Each dimension upconversion circuits 282, 284 and 286 may be operational to upconvert an input vector to the dimensions P×D×H×W. The dimension upconversion circuit 282 may generate a vector (e.g., VD) received by the circuit 288. The dimension upconversion circuit 284 may generate a vector (e.g., VE) received by the circuit 290. The dimension upconversion circuit 286 may generate a vector (e.g., VF) received by the circuit 292.

Each circuit 288, 290 and 292 may implement a precision upconversion circuit. Each precision upconversion circuit 288, 290 and 292 may be operational to covert each element of an input vector to an internal precision (e.g., double-precision floating point). The precision upconversion circuit 288 may generate a vector (e.g., VG) having the dimensions P×D×H×W and the double-precision floating point format. The precision upconversion circuit 290 may generate a vector (e.g., VH) having the dimensions P×D×H×W and the double-precision floating point format. The precision upconversion circuit 292 may generate a vector (e.g., VI) having the dimensions P×D×H×W and the double-precision floating point format.

The circuit 294 may implement an addition circuit. The addition circuit 294 is generally operational to add the vectors VG and VH to create a vector (e.g., VJ). The vector VJ may have the dimensions P×D×H×W and the internal precision/format. The vector VJ may be received by the circuit 296.

The circuit 296 may implement a multiplication circuit. The multiplication circuit 296 is generally operational to multiply in an element-wise fashion the vectors VI and VJ to create a vector (e.g., VK). The vector VK may have the dimensions P×D×H×W and the internal precision/format. The vector VK may be received by the circuit 298.

The circuit 298 may implement a precision downconversion circuit. The downconversion circuit 298 is generally operational to down convert each element of an input vector from the internal precision to an output precision. In the example illustrated, the precision downconversion circuit 298 may generate an output vector (e.g., VL). The output vector VL may have the dimensions P×D×H×W and the single-precision fixed point format.

Computer vision techniques commonly process variable sized lists of objects that meet specific conditions. The size may be dynamic as the number of objects depends on the result of certain operations in the graph like conditional checks. However, sizing decisions of vectors are generally made statically during directed acyclic graph construction.

The vector processor implements two types of variable-length vectors: jagged vectors and short vectors. The variable-length vectors may still be described as N-dimensional vectors may be are either unary/significant along each dimension just like normal vectors. A variable/normal state of a vector may be maintained by the scheduler circuit 120 and propagated to the consuming operators by the scheduler circuit 120.

Figure 5:
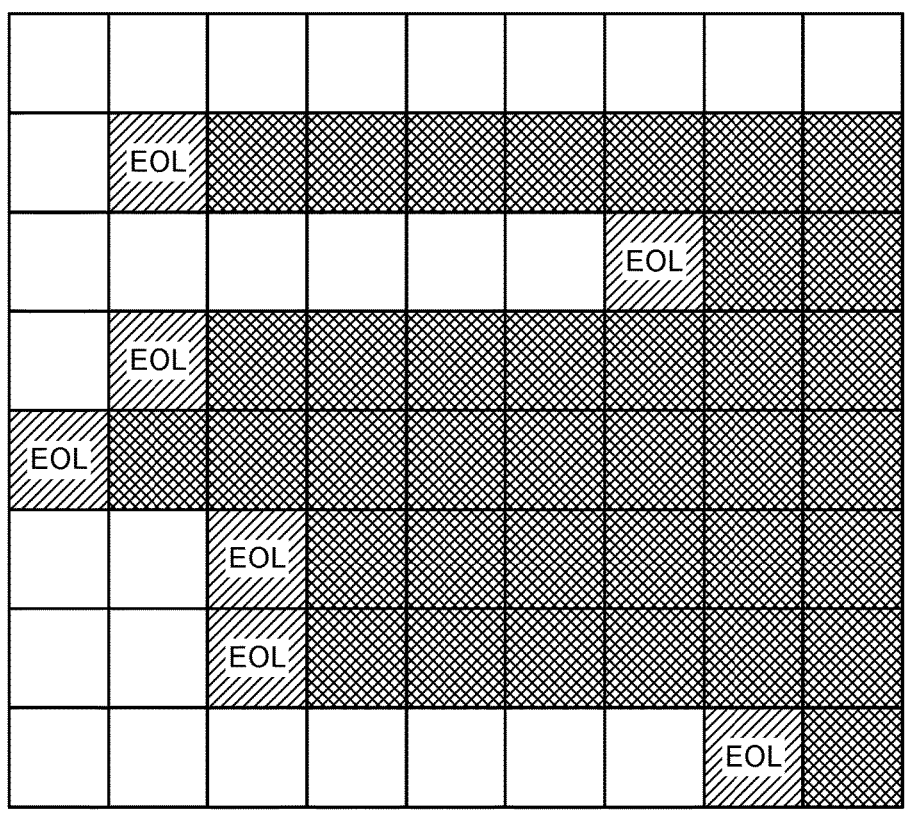
FIG. 5 is a diagram of a jagged vector.

Referring to FIG. 5, a diagram of an example implementation of a jagged vector 300 is shown. Each index in a single dimension of the jagged vector 300 may contain a different number of valid elements (e.g., have a different effective length). The single dimension is normally the lowest dimension. In the example shown, each row of the two-dimensional jagged vector 300 may contain a different number of valid elements (e.g., white squares) and invalid elements (e.g., crosshatched squares). The jagged vectors generally reserve one or more values for special termination symbol(s) that mark all remaining entries along a dimension as invalid. For example, an end-of-row (EOL) symbols may exist in one or more of the rows of the jagged vector 300.

Consuming operators in the hardware engines 122a-122n may ignore elements or higher-dimensional blocks after the termination symbol and advance to the next valid entry in the vector. In various embodiments, different symbols may be reserved for each dimension (e.g., EOL for end-of-row, EOF for end-of-frame, etc., up to the Nth dimension). In some embodiments, the vectors may contain a marker for a subset of the dimensions (e.g., a single EOL marker, but valid everywhere else). The termination symbols generally occupy values of the range defined by the data format of the vector, so the dynamic range of the vector may be reduced when the jagged vectors are used. Dimensions of the vectors where all elements are valid may not utilize any termination symbols.

An operator may produce a result that aliases with the termination symbol during normal processing. In some embodiments, the operator may suppress (or alter) the result value to avoid the termination symbol by clamping the result value to a valid value within the dynamic range of the vector data type. In other embodiments, the operator may flag an error and/or generate an invalid vector.

The short vectors may be similar to the jagged vectors but lack the termination symbols. Suppression is generally unnecessary for the short vectors as the full dynamic range of the vector data format is available for all values. The exact location of the end of a dimension may be maintained by the coprocessor 104 and may propagate through the downstream operators. The termination locations may not be visible to software directly. In such cases, the termination locations may by calculated within the directed acyclic graph using sideband operators or inferred by software executing in the processor 102 using other information available in the graph.

Figure 6:
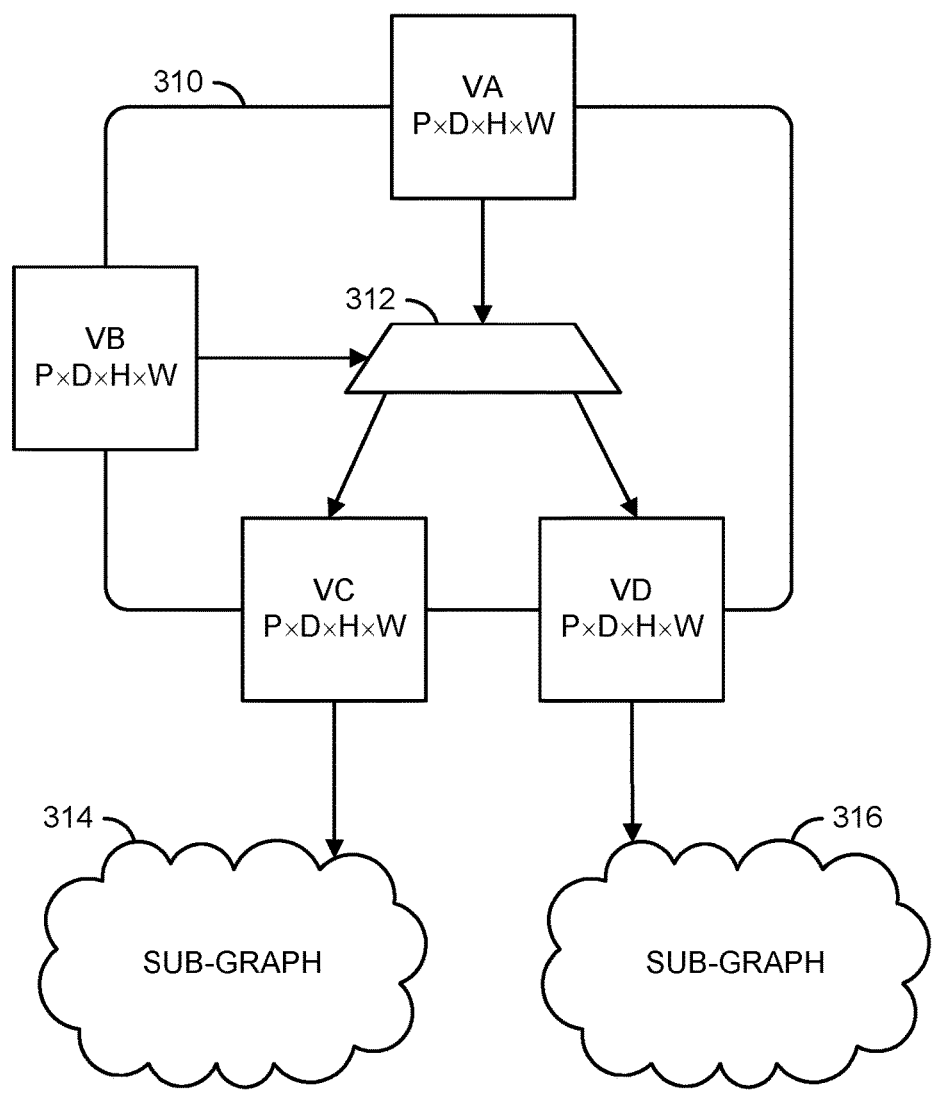
FIG. 6 is a diagram of an operator for creating jagged vectors along a width dimension.

Referring to FIG. 6, a diagram of an example implementation of a demultiplex operator 310 for creating jagged vectors along a width dimension is shown. The coprocessor 104 generally provides for the creation, propagation and consumption of the jagged vectors. All vectors may begin as normal vectors, but an operator may produce a jagged vector during processing of the directed acyclic graph. The demultiplex operator 310 may include a block (or circuit) 312. The circuit 312 may be implemented in one or more of the hardware engines 122a-122n.

A vector (e.g., VA) may be received by the circuit 312. The vector VA may be a normal multidimensional input vector. The circuit 312 may receive another vector (e.g., VB). The vector VB may be a select vector that conveys jagged information to be applied to the vector VA. The circuit 312 may generate a vector (e.g., VC) received by a sub-graph 314 within a directed acyclic graph. The vector VC may be a jagged version of the input vector VA. The circuit 312 may also generate a vector (e.g., VD) received by a sub-graph 316 within the directed acyclic graph. The vector VD may be another jagged version of the input vector VA. The circuit 312 may implement a demultiplexer circuit.

The demultiplexer circuit 312 is generally operational generate both the jagged output vector VC and the jagged output vector VD from the input vector VA based on the information in the select vector VB. The demultiplexer circuit 312 may perform an element or block-wise select from the input vector VA depending on the size of the select vector VB.

Dimensions of the select vector VB (e.g., P×D×H×W) generally match the dimensions of the input vector VA (e.g., P×D×H×W). The select vector VB may contain a select bit in a particular dimension (normally the lowest dimension) per each element in the input vector VA. If the select bit is set (e.g., a 1 value), the demultiplexer circuit 312 may route (or store) the corresponding element to the input vector VA to the output vector VC. If not (the select bit has a 0 value), the demultiplexer circuit 312 may route (or store) the corresponding element to the input vector VA to the output vector VD. In the input space, everything generally moves along in lock step, but at the end of the particular dimension (e.g., width), a variable number of elements may reside in each row of the output vectors VC and VD. The demultiplexer circuit 312 may pad out with EOL symbols to complete the row, or store a single EOL symbol and advance write pointers to the next row.

Figure 7:
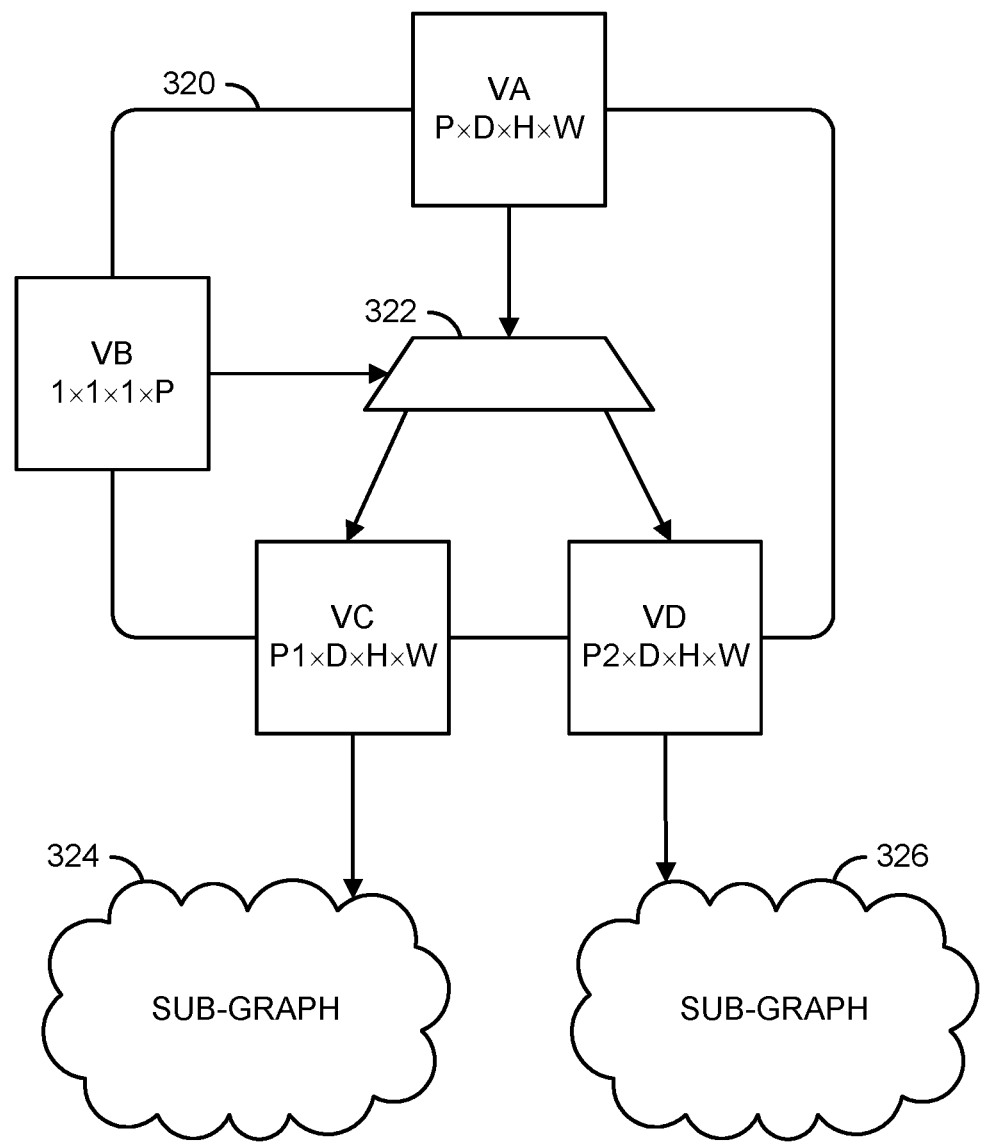
FIG. 7 is a diagram of an operator for creating short vectors along a planar dimension.

Referring to FIG. 7, a diagram of an example implementation of a demultiplex operator 320 for creating short vectors along a planar dimension is shown. The coprocessor 104 generally provides for the creation, propagation and consumption of the short vectors. All vectors may begin as normal vectors, but an operator may produce a short vector during processing of the directed acyclic graph. The demultiplex operator 320 may include a block (or circuit) 322. The circuit 322 may be implemented in one or more of the hardware engines 122a-122n.

A vector (e.g., VA) may be received by the circuit 322. The vector VA may be a normal multidimensional input vector. The circuit 322 may receive another vector (e.g., VB). The vector VB may be a select vector that conveys shortening information (e.g., an index vector) to be applied to the vector VA. The circuit 322 may generate a vector (e.g., VC) received by a sub-graph 324 within a directed acyclic graph. The vector VC may be a shortened version of the input vector VA. The circuit 322 may also generate a vector (e.g., VD) received by a sub-graph 326 within the directed acyclic graph. The vector VD may be another shortened version of the input vector VA.

The circuit 322 may implement a demultiplexer circuit. The demultiplexer circuit 322 is generally operational generate both the short output vector VC and the short output vector VD from the input vector VA based on the information in the select vector VB. The short vector case generally works when an index vector within VB matches the highest significant dimension (e.g., 1×1×1×P), and indicates a selection of all the lower dimensions in the input vector VA together as a block. In planar cases, a single select element may be present per plane. If the bit is set (e.g., a value of 1), the lower dimensions (e.g., three-dimensional block) of the input vector VA may be routed (or stored) to the output vector VC. Otherwise (e.g., the bit has a value of 0), the block in the input vector VA may be routed (or stored) to the output vector VD. The dimensions P1 and P2 may sum to the dimension P (e.g., P=P1+P2).

The vectors VC and/or VD may be considered short due to a lack of the "EOL" symbol to indicate the last plane in the vectors VC and VD. If the planar dimension is scalar (e.g., 1), the depth may be the select dimension. In such cases, the dimensions of the select vector VB becomes 1×1×1×D.

Figure 8:
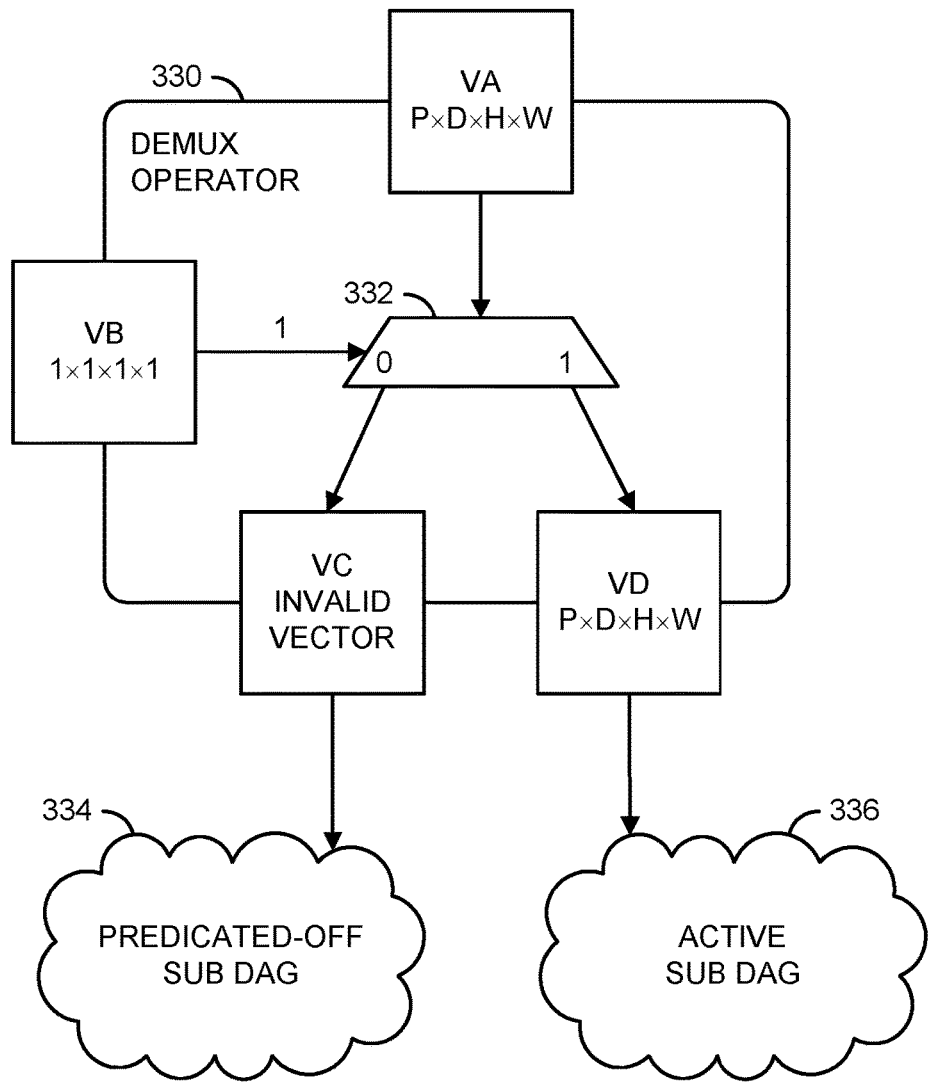
FIG. 8 is a diagram of an operator for handling invalid vectors.

Referring to FIG. 8, a diagram of an example implementation of a demultiplex operator 330 for handling invalid vectors is shown. The demultiplex operator 330 may include a block (or circuit) 332. The circuit 332 may be implemented in one or more of the hardware engines 122a-122n. To address conditional execution of subgraphs with a directed acyclic graph, the coprocessor 104 generally provides for invalid vectors. All vectors may begin as valid vectors, but an operator may produce a valid vector or an invalid vector during processing of the directed acyclic graph. The valid vectors may be presented by the operator. The invalid vectors may be presented by the operator marked as invalid. Any downstream operator that consumes an invalid vector may immediately propagate invalid vectors to all corresponding output operands and subsequently halt processing.

Invalid vectors may be created by the directed acyclic graph programs deliberately or created due to some illegal condition detected during execution. For example, floating point exceptions causing not-a-number (NaN) results (e.g., values representing undefined values) may create an invalid vector condition. A valid/invalid state of a vector may be maintained by the scheduler circuit 120 and propagated to the consuming operators by the scheduler circuit 120.

A vector (e.g., VA) may be received by the circuit 332. The vector VA may be a multidimensional input vector that is either valid or invalid. The circuit 332 may receive another vector (e.g., VB). The vector VB may be a scalar vector that conveys the valid/invalid state of the vector VA. The circuit 332 may generate a vector (e.g., VC) received by a subgraph 334 within a directed acyclic graph. The vector VC may be similar to the invalid input vector VA. The circuit 332 may also generate a vector (e.g., VD) received by an active subgraph 336 within a directed acyclic graph. The vector VD may be similar to the valid input vector VA.

The circuit 332 may implement a demultiplexer circuit. The demultiplexer circuit 332 is generally operational to present the input vector VA as either the invalid output vector VC or the valid output vector VD based on the valid/invalid state in the vector VB. If the state conveyed by the vector VB is valid, the demultiplexer circuit 332 may generate the valid output vector VD similar to the valid input vector VA. If the state of the vector VB is invalid, the demultiplexer circuit 332 may generate the invalid output vector VC similar to the invalid input vector VA.

Referring to FIG. 9, a diagram of a camera system 340 is shown illustrating an example implementation of a vector processing system in accordance with an embodiment of the present invention. In one example, the electronics of the camera system 340 may be implemented as one or more integrated circuits. For example, an application specific integrated circuit (ASIC) or system on chip (SOC) may be used to implement the camera system 340.

In one example, the camera system 340 may comprise the DRAM circuit 106, a processor/camera chip (or circuit) 342, a block (or assembly) 344 having a block 346 and one or more blocks (or circuits) 348, a block (or circuit) 350, a block (or circuit) 352, a block (or circuit) 354, a block (or circuit) 356, a block (or circuit) 358, a block (or circuit) 360, a block (or circuit) 362 and a block (or circuit) 364. The circuits 106 and 344-364 may be connectable to the camera circuit 342.

In various embodiments, the camera circuit 342 may comprise one or more processors 102 (e.g., ARM, etc.), one or more coprocessors 104, a block (or circuit) 370, a block (or circuit) 372, a block (or circuit) 374, a block (or circuit) 376, a block (or circuit) 378, a block (or circuit) 380, a block (or circuit) 382, a block (or circuit) 384, a block (or circuit) 386 and a block (or circuit) 388. The circuits 102 through 388 may be connected to each other using one or more buses, traces, protocols, etc.

The circuit 344 may implement a lens and sensor assembly. The lens and sensor assembly 344 is shown connected to the camera circuit 342. In some embodiments, the lens and sensor assembly 344 may be a component of the camera circuit 342 (e.g., a SoC component). In some embodiments, the lens and sensor assembly 344 may be a separate component from the camera circuit 342 (e.g., the lens and sensor assembly may be an interchangeable component compatible with the camera circuit 342). In some embodiments, the lens and sensor assembly 344 may be part of a separate camera connected to the processing portion of the circuit 342 (e.g., via a video cable, a high definition media interface (HDMI) cable, a universal serial bus (USB) cable, an Ethernet cable, or wireless link). The lens and sensor assembly 344 may comprise other components (not shown). The number, type and/or function of the components of the lens and sensor assembly 344 may be varied according to the design criteria of a particular application.

The block 346 may implement a lens 346. The lens 346 may capture and/or focus light input received from the environment near the camera 340. The lens 346 may capture and/or focus light for the circuit 348. The lens 346 may be implemented as an optical lens. The lens 346 may provide a zooming feature and/or a focusing feature. The lens and sensor assembly 344 may be implemented with additional circuitry (e.g., motors) to adjust a direction, zoom and/or aperture of the lens 346. The lens 346 may be directed, tilted, panned, zoomed and/or rotated to provide a targeted view of the environment near the camera 340.

The circuit 348 may implement an image sensor. The image sensor 348 may receive light from the lens 346. The image sensor 348 may be configured to transform the received focused light into digital data (e.g., bitstreams). In some embodiments, the image sensor 348 may perform an analog to digital conversion. For example, the image sensor 348 may perform a photoelectric conversion of the focused light received from the lens 346. The image sensor 348 may present the converted image data as a color filter array (CFA)

formatted bitstream. The camera circuit 342 may transform the bitstream into video data, video files and/or video frames (e.g., human-legible content).

The circuit 350 may be a microphone for capturing audio. The circuit 352 may be an audio codec for recording audio in a particular format. The circuit 354 may be a speaker for playing audio.

The circuit 356 may implement a nonvolatile memory (e.g., NAND flash memory, NOR flash memory, etc.). The circuit 358 may implement a removable media 358 (e.g., secure digital media (SD), secure digital extended capacity media (SDXC), etc.). The circuit 360 may implement one or more serial communication channels 360 (e.g., RS-485, RS-232, etc.). The circuit 362 may implement one or more universal serial bus (USB) hosts 362 and/or USB interfaces. The circuit 364 may implement wireless interface for communicating with a user device (e.g., a smart phone, a computer, a tablet computing device, cloud resources, etc.). In various embodiments, the wireless interface 364 and/or the USB Host 362 may be configured for communicating with a camera controller wirelessly. In the embodiment shown, the circuits 344-364 are implemented as components external to the camera circuit 342. In some embodiments, the circuits 344-364 may be components on-board the camera circuit 342.

The circuit 370 may be a digital signal processing (DSP) module. In some embodiments, the circuit 370 may implement separate image DSP and video DSP modules. The DSP module 370 may be configured to process digital signals. The DSP module 370 may comprise an image digital signal processor (IDSP), a video digital signal processor DSP (VDSP) and/or an audio digital signal processor (ADSP). The DSP module 370 may be configured to receive information (e.g., pixel data values captured by the image sensor 348) from the circuit 376. The DSP module 370 may be configured to determine the pixel values (e.g., RGB, YUV, luminance, chrominance, etc.) from the information received from the sensor input 376. The DSP module 370 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 372 may be a storage interface. The storage interface 372 may be configured to manage one or more types of storage and/or data access. In one example, the storage interface 372 may implement a direct memory access (DMA) engine and/or a graphics direct memory access (GDMA). In another example, the storage interface 372 may implement a secure digital (SD) card interface (e.g., to connect to the removable media 358).

The circuit 374 may implement a local memory system (e.g., cache, fast random access memory, etc.). In various embodiments, programming code (e.g., executable instructions for controlling various processors and encoders of the camera circuit 342) may be stored in one or more of the memories (e.g., the DRAM circuit 106, the NAND 356, etc.). When executed by the processors 102, the programming code generally causes one or more components in the camera circuit 342 to configure video synchronization operations and start video frame processing operations. The resulting compressed video signal may be presented to the storage interface 372, the video output 386 and/or the communication module 388. The storage interface 372 may transfer program code and/or data between external media (e.g., the DRAM circuit 106, the NAND 356, the removable media 358, etc.) and the local (internal) memory system 374.

The circuit 376 may implement a sensor input (or interface). The sensor input 376 may be configured to send/receive data to/from the image sensor 348. In one example, the sensor input 376 may comprise an image sensor input interface. The sensor input 376 may be configured to transmit captured images (e.g., light data) from the image sensor 348 to the DSP module 370 and/or the processors 102. The data received by the sensor input 376 may be used by the DSP 370 to determine a luminance (Y) and chrominance (U and V) values from the image sensor 348. The sensor input 376 may provide an interface to the lens and sensor assembly 344. The sensor input 376 may enable the camera circuit 342 to capture image data from the lens and sensor assembly 344.

The circuit 378 may implement one or more control interfaces including but not limited to an inter device communication (IDC) interface, an inter integrated circuit ($I^2C$) interface, a serial peripheral interface (SPI), and a pulse width modulation (PWM) interface. The control interface 378 may be configured to generate signals (e.g., IDC/I2C, STEPPER, IRIS, AF/ZOOM/TILT/PAN, etc.) for controlling the lens and sensor assembly 344. The signal IRIS may be configured to adjust an iris for the lens and sensor assembly 344. The control interface 378 may enable the camera circuit 342 to control the lens and sensor assembly 344.

The circuit 380 may implement an audio interface (e.g., an $I^2S$ interface, etc.). The audio interface 380 may be configured to send/receive audio data. In one example, the audio interface 380 may implement an audio inter-IC sound ($I^2S$) interface. The audio interface 380 may be configured to send/receive data in a format implemented by the audio codec 352. The circuit 382 may implement a clock circuit including but not limited to a real time clock (RTC), a watchdog timer (WDT), and/or one or more programmable timers.

The circuit 384 may implement an input/output (I/O) interface. The I/O interface 384 may be configured to send/receive data. The data sent/received by the I/O interface 384 may be miscellaneous information and/or control data. In one example, the I/O interface 384 may implement a general purpose input/output (GPIO) interface. In another example, the I/O interface 384 may implement an analog-to-digital converter (ADC) module and/or digital-to-analog converter (DAC) module. In yet another example, the I/O interface 384 may implement an infrared (IR) remote interface. In still another example, the I/O interface 384 may implement one or more synchronous data communications interfaces (IDC SPI/SSI).

The circuit 386 may be a video output module. The video output module 386 may be configured to send video data. For example, the camera 340 may be connected to an external device (e.g., a TV, a monitor, a laptop computer, a tablet computing device, etc.). The video output module 386 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 388 may be a communication module. The communication module 388 may be configured to send/receive data. The data sent/received by the communication module 388 may be formatted according to a particular protocol (e.g., Bluetooth, USB, Wi-Fi, UART, etc.). In one example, the communication module 388 may implement a secure digital input output (SDIO) interface. The communication module 388 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 388 may also include support for communicating using one or more of the universal serial bus protocols (e.g., USB 1.0, 2.0, 3.0, etc.). The camera circuit 342 may also be configured to be powered via a USB connection. However, other communication and/or power interfaces may be implemented accordingly to meet the design criteria of a particular application.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a scheduler circuit configured to (i) store a directed acyclic graph, (ii) parse said directed acyclic graph into one or more operators and (iii) schedule said one or more operators in one or more data paths; and
a plurality of hardware engines (i) configured as a plurality of said data paths and (ii) configured to generate one or more output vectors by processing zero or more input vectors using said operators, wherein (a) one or more of said hardware engines supports a range of multiple dimensions of said input vectors from zero dimensions to at least four dimensions and (b) one or more of said hardware engines is implemented solely in hardware.

2. The apparatus according to claim 1, further comprising a processor in communication with said scheduler circuit, wherein said scheduler circuit and said hardware engines form part of a coprocessor that supports one or more programs executing in said processor.

3. The apparatus according to claim 1, wherein at least one of said hardware engines is configured to upconvert a unary dimension of a first of said input vectors into a significant dimension of a second of said input vectors such that both said first input vector and said second input vector have common sized dimensions.

4. The apparatus according to claim 1, wherein at least one of said hardware engines is configured to process at least one of said operators that consumes both a first of said input vectors and a second of said input vectors that have common sized dimensions.

5. The apparatus according to claim 1, wherein at least one of said hardware engines is configured to process at least one of said input vectors having a variable length.

6. The apparatus according to claim 1, wherein at least one of said input vectors (i) has a variable length and (ii)

comprises one or more termination symbols that mark all entries along a corresponding dimension after said termination symbols as invalid.

7. The apparatus according to claim 6, wherein said terminations symbols have different types along different ones of said dimensions.

8. The apparatus according to claim 6, wherein said hardware engines are configured to ignore said entries after said termination symbols.

9. The apparatus according to claim 1, wherein one or more effective lengths of said dimensions of at least one of said input vectors having a variable length are maintained outside of said at least one input vector having said variable length.

10. The apparatus according to claim 9, wherein said scheduler circuit propagates said effective lengths of said dimensions of said vector having said variable length to one or more downstream operators.

11. The apparatus according to claim 1, wherein said hardware engines are configured to generate one or more invalid output vectors while processing said operators.

12. The apparatus according to claim 11, wherein said hardware engines are further configured to generate said invalid output vectors in response to consuming one or more invalid input vectors.

13. The apparatus according to claim 1, wherein said scheduler circuit is implemented solely in hardware.

14. The apparatus according to claim 1, wherein said directed acyclic graph defines a computer vision process.

15. The apparatus according to claim 1, wherein all of said hardware engines are implemented solely in hardware.

16. A method for vector processing, comprising the steps of:
storing a directed acyclic graph in a scheduler circuit;
parsing said directed acyclic graph into a plurality of operators;
scheduling said one or more operators in one or more data paths; and
generate one or more output vectors by processing zero or more input vectors in a plurality of hardware engines using said operators, wherein (i) said hardware engines are configured as a plurality of said data paths, (ii) one or more of said hardware engines supports a range of multiple dimensions of said input vectors from zero dimensions to at least four dimensions and (iii) one or more of said hardware engines is implemented solely in hardware.

17. The method according to claim 16, further comprising the step of:
upconverting a unary dimension of a first of said input vectors into a significant dimension of a second of said input vectors such that both said first input vector and said second input vector have common sized dimensions.

18. The method according to claim 16, further comprising the step of:
processing at least one of said input vectors having a variable length.

19. The method according to claim 18, wherein said at least one input vector having said variable length comprises one or more termination symbols that mark all entries along a corresponding dimension after said termination symbols as invalid.

20. The method according to claim 16, further comprising the step of:
processing at least one of said operators that consumes both a first of said input vectors and a second of said input vectors that have common sized dimensions.

* * * * *